July 22, 1924.
Re. 15,876
H. B. P. WRENN ET AL
OVERHEAD ELECTRICAL CONDUCTOR SYSTEM
Original Filed Nov. 11, 1922
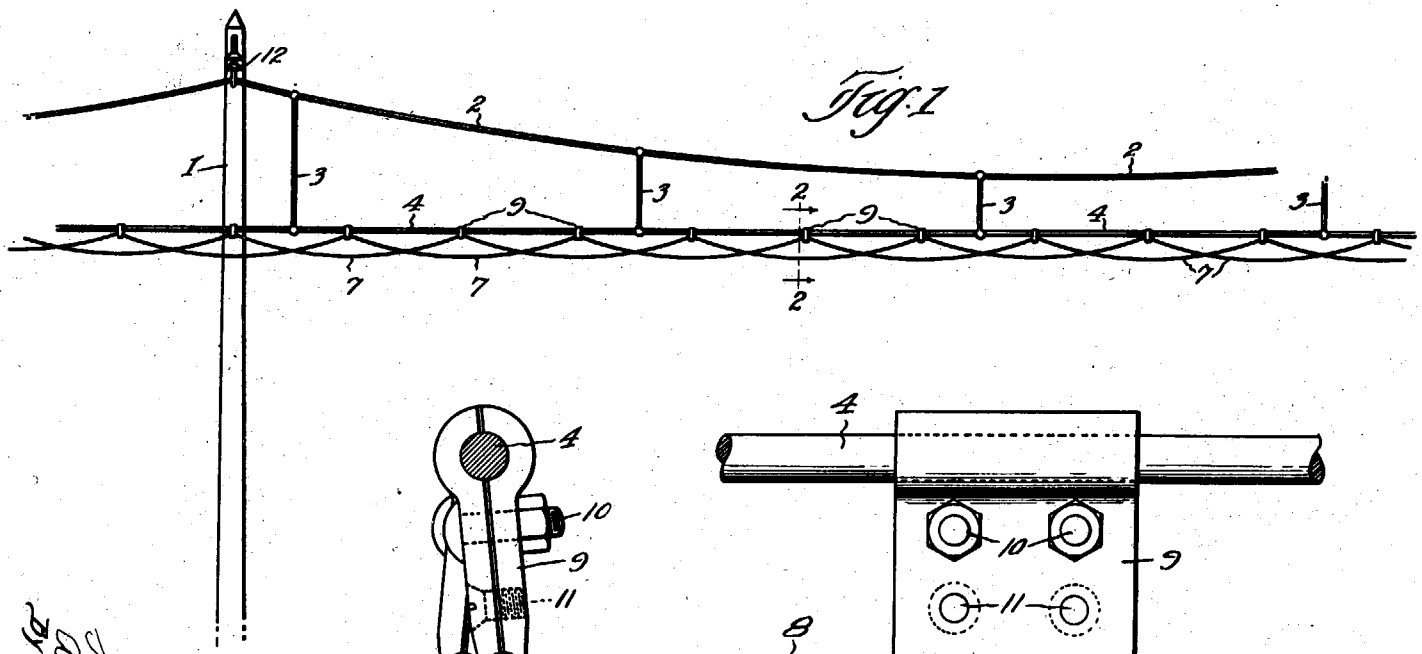
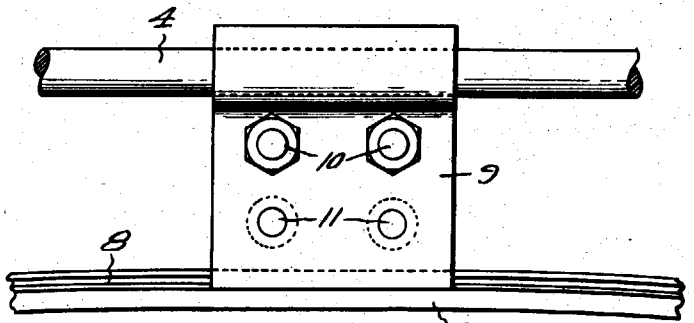
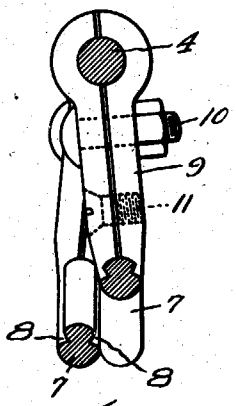
Inventors
Henry B. P. Wrenn 2nd
Aloysius A. O'Donoghue
By Hull, Brock & West
Attys.

Reissued July 22, 1924. Re. 15,876

UNITED STATES PATENT OFFICE.

HENRY B. P. WRENN AND ALOYSIUS S. O'DONOGHUE, OF CLEVELAND, OHIO.

OVERHEAD ELECTRICAL CONDUCTOR SYSTEM.

Original No. 1,459,174, dated June 19, 1923, Serial No. 600,458, filed November 11, 1922. Application for reissue filed June 4, 1924. Serial No. 717,912.

*To all whom it may concern:*

Be it known that we, HENRY B. P. WRENN and ALOYSIUS S. O'DONOGHUE, citizens of the United States, residing at Cleveland, in the county of Cuyahoga and State of Ohio, have invented a certain new and useful Improvement in Overhead Electrical Conductor Systems, of which the following is a full, clear, and exact description, reference being had to the accompanying drawings.

This invention relates to overhead conductor systems for electrical railways and has particular reference to a system for use in connection with heavy duty types of electric locomotives and motor cars.

The primary object of the present invention is to provide an overhead suspension system which shall comprise a main feeder conductor suspended in any suitable manner and from which are supported a plurality of wear resisting contact wires which shall receive current from said conductor at certain definite points.

Another object is to provide an overhead suspension system which shall be composed of a plurality of contact wires arranged in such manner that movement of the collector thereover will cause a movement of said contact wires in advance of said collector which shall serve to dislodge ice and snow from said wires.

Another object is to provide an overhead suspension system which shall have a plurality of wires in direct contact with the collector at all times thereby providing a maximum area of contact which shall reduce arcing to a minimum.

Another object is to provide an overhead suspension system which shall be so constructed as to provide flexibility between the collector and contact wires and be devoid of what are commonly referred to as "hard spots."

A still further object is to provide a suspension system of the aforesaid character which shall be easy to erect and maintain, highly durable in operation, and which shall consist of few parts.

With these and other objects in view, the invention consists in the various novel features of construction and arrangement or combination, all of which will be fully described hereinafter and pointed out in the appended claims.

In the accompanying drawing wherein we have shown one form of our invention, Fig. 1 is a side elevation of a portion of an overhead suspension employing our improved construction; Fig. 2 is an enlarged sectional view taken on the line 2—2 of Fig. 1; and Fig. 3 is an enlarged side elevation of one of the clamps for fastening the contact wire to the main feeder conductor.

Describing the various parts by reference characters 1 denotes a suitable support from which a suspension cable 2 is hung. A plurality of hangers 3 depend from cable 2 at spaced intervals and these hangers support a main feeder conductor 4 which is adapted to transmit the electrical energy for the system. This conductor is preferably made of a metal which is a good conductor of electricity; such as copper or phosphor bronze and may be either of a solid or stranded nature.

Suspended from feed wire 4 are a plurality of contact wires 7 which may be made of steel or other wear resisting metal. In the present instance I have shown two contact wires although it will be understood that more than two wires may be employed for heavier currents where desired. Each wire is provided with undercut portions 8 to form essentially a dovetail cross section for the reception of the clamps 9. Each of the clamps is preferably formed of two pieces of metal fastened together in any suitable manner as by bolts 10 and screws 11 and having the upper end thereof shaped to receive the feed conductor 4 and the lower end shaped to conform to the dovetailed portion of the contact wire.

These clamps serve as electrical connections between the main feeder conductor 4 and the contact wires 7 and permit current to flow from said feed conductor to the contact wires at a plurality of points thereby reducing the resistance of the transfer to a minimum.

As shown in exaggerated form in Fig. 1, one of the wires 7 is suspended from feed conductor 4 by the aforesaid clamps attached at definite intervals along the main feeder conductor and the other of said contact wires is fastened in a similar manner at points intermediate to the clamps of the first mentioned wire, thereby forming a series of overlapping loops for contact with a sliding or rolling collector.

It will be noted in this connection, that hangers 3 are attached to feed conductor 4 at points substantially midway of two adjacent clamps. This arrangement provides flexibility for the system and tends to eliminate what are commonly referred to as "hard spots." In other words, as the collector moves over the contact wires 7, it will force them upward to the same level and the maximum upward movement of these wires will occur at the point where they cross, which is substantially the midpoint between two clamps. The hangers 3 are in vertical alignment with such midpoint and hence any upward thrust will be absorbed by the aforesaid upward movement of the contact wires at this point and will not be transmitted to the hangers.

As the collector moves over the contact wires, it will force them upward to the same level as previously described and thereby cause a relative shearing movement between said contact wires in advance of the collector. This movement of the contact wires and the shearing effect produced therefrom will serve to loosen and clear any ice or snow which might collect on the wires and such loosening and clearing of ice and snow will be in advance of the line of travel of the collector, thereby permitting the collector to make good electrical contact with the wires 7 at all times.

The system as a whole is insulated in any suitable manner as by insulators 12 interposed between cable 2 and the supports therefor.

It will be understood that where the term "wire" occurs in the specification and appended claims, such terms is used in its broadest sense to include a conductor in either the solid or stranded form.

Having thus described our invention, what we claim is:

1. An electrical system of the character set forth comprising a feeder wire, a plurality of contact wires positively and independently connected to said feeder wire to form a positive electrical connection therewith thereby to permit the transfer of electrical energy from such feeder wire to said contact wires without arcing or sparking, said contact wires being arranged in a series of freely suspended overlapping loops whereby a shearing action between said contact wires will be effected at substantially all points along said wires as a current collecting device moves therealong.

2. An electrical system of the character set forth comprising a feeder wire, a plurality of contact wires positively and independently connected to said feeder wire at a plurality of points, said points of connection between said feeder wire and contact wires each serving as a positive electrical connection to permit the transfer of electrical energy from said feeder wire to said contact wires without arcing or sparking, said contact wires being arranged in a series of freely suspended overlapping loops whereby a shearing action between said contact wires will be effected at substantially all points along said wires as a current collecting device moves therealong.

3. An electrical system of the character set forth comprising a suspension cable, a feeder wire of high conductivity suspended from said cable, and a plurality of wear resisting contact wires connected to said feeder wire, the points of connection of said feeder wire and suspension cable lying intermediate to the points of connection of said contact wires with said feeder wire.

4. An electrical system of the character set forth comprising a suspension cable, a feeder wire suspended from said suspension cable, and a plurality of contact wires connected to said feeder wire.

5. An electrical system of the character set forth comprising a suspension cable, a feeder wire suspended from said suspension cable, and a plurality of contact wires suspended from said feeder wire, said contact wires being arranged to define a series of overlapping loops, thereby to cause a shearing movement of one contact wire with an adjacent contact wire in advance of a collector moving thereon.

6. An electrical system of the character sea forth comprising a suspension cable, a feeder wire suspended from said suspension cable, and a pair of contact wires suspended from said feeder wire, one of said contact wires being connected to said feeder wire, at spaced intervals to define a series of loops, and the other of said contact wires being connected to said feeder wire intermediate to the points of connection of said first mentioned wire thereby to provide a second series of loops overlapping the first mentioned series of loops.

7. An electrical system of the character set forth comprising a feeder wire and a plurality of contact wires clamped to said feeder wire at a plurality of points, said clamps serving as conductors for the transfer of electrical energy from said feeder wire to said contact wires.

In testimony whereof, we hereunto affix our signatures.

HENRY B. P. WRENN.
ALOYSIUS S. O'DONOGHUE.